(12) United States Patent
Jeong

(10) Patent No.: US 11,691,498 B2
(45) Date of Patent: Jul. 4, 2023

(54) VEHICLE RADIATOR ASSEMBLY AND COOLING SYSTEM HAVING THE SAME

(71) Applicants: HYUNDAI MOTOR COMPANY, Seoul (KR); KIA MOTORS CORPORATION, Seoul (KR)

(72) Inventor: Seong Bin Jeong, Gyeonggi-do (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 305 days.

(21) Appl. No.: 17/026,689

(22) Filed: Sep. 21, 2020

(65) Prior Publication Data

US 2021/0354552 A1 Nov. 18, 2021

(30) Foreign Application Priority Data

May 13, 2020 (KR) .................. 10-2020-0057394

(51) Int. Cl.
*B60K 11/02* (2006.01)
*F03G 7/06* (2006.01)
*B60K 6/22* (2007.10)

(52) U.S. Cl.
CPC .............. *B60K 11/02* (2013.01); *F03G 7/065* (2013.01); *B60K 6/22* (2013.01); *B60Y 2200/92* (2013.01); *B60Y 2306/05* (2013.01); *B60Y 2410/136* (2013.01)

(58) Field of Classification Search
CPC ......... B60K 11/02; B60K 11/04; B60K 11/00; B60K 6/22; B60Y 2200/92; B60Y 2306/05; B60Y 2410/136; F03G 7/065; F03G 7/0613; F03G 7/06; F03G 7/061; F03G 7/0614; F01P 11/029; F01P 11/00; F01P 11/02; F28D 1/0435; F28D 1/05366; F28F 2255/04

See application file for complete search history.

(56) References Cited

U.S. PATENT DOCUMENTS 4,669,532 A * 6/1987 Tejima ............... G05D 23/1333
236/93 R
4,865,249 A * 9/1989 Sugano ................ G05D 23/123
123/41.15

(Continued)

*Primary Examiner* — James M Dolak
(74) *Attorney, Agent, or Firm* — Lempia Summerfield Katz LLC

(57) ABSTRACT

A vehicle radiator assembly includes: a common inlet tank having a high temperature inlet chamber and a low temperature inlet chamber; a common outlet tank spaced apart from the common inlet tank and including a high temperature outlet chamber and a low temperature outlet chamber; a high temperature radiator core including a plurality of high temperature tubes connecting the high temperature inlet chamber and the high temperature outlet chamber, and a plurality of high temperature cooling fins arranged with the plurality of high temperature tubes; a low temperature radiator core including a plurality of low temperature tubes connecting the low temperature inlet chamber and the low temperature outlet chamber, and a plurality of low temperature cooling fins arranged with the plurality of low temperature tubes; and a bimetal interposed between the high temperature radiator core and the low temperature radiator core.

10 Claims, 16 Drawing Sheets

(56) References Cited

U.S. PATENT DOCUMENTS

| | | | |
|---|---|---|---|
| 8,056,231 B2* | 11/2011 | Luvisotto | F16K 15/16 |
| | | | 29/890.03 |
| 8,556,186 B2* | 10/2013 | Sand | F01P 7/16 |
| | | | 236/101 E |
| 8,839,748 B2* | 9/2014 | Kim | F01P 7/16 |
| | | | 165/103 |
| 9,255,748 B2* | 2/2016 | Cho | F28F 27/02 |
| 10,046,665 B2* | 8/2018 | Ishikawa | B60L 3/003 |
| 10,107,382 B2* | 10/2018 | Tokozakura | F16H 57/0436 |
| 10,385,760 B2* | 8/2019 | Quevallier | F01P 11/028 |
| 10,414,265 B2* | 9/2019 | Ishikawa | H05K 7/20927 |
| 10,677,141 B2* | 6/2020 | Michikawauchi | F01P 11/00 |

\* cited by examiner

VEHICLE RADIATOR ASSEMBLY AND COOLING SYSTEM HAVING THE SAME

CROSS-REFERENCE TO RELATED APPLICATION

This application claims priority to and the benefit of Korean Patent Application No. 10-2020-0057394, filed on May 13, 2020, the entire contents of which are incorporated herein by reference.

FIELD

The present disclosure relates to a vehicle radiator assembly and a cooling system having the same, and more particularly, to a vehicle radiator assembly and a cooling system having the same capable of efficiently managing the cooling efficiency of a high temperature coolant loop and the cooling efficiency of a low temperature coolant loop.

BACKGROUND

The statements in this section merely provide background information related to the present disclosure and may not constitute prior art.

Hybrid vehicles are next-generation eco-friendly vehicles that are equipped with an internal combustion engine and an electric motor to reduce harmful emissions and significantly increase fuel efficiency compared to general vehicles. The electric motor is powered by a high-voltage battery mounted inside the vehicle, and the battery is recharged when the vehicle decelerates. The engine and motor power may be appropriately controlled according to the vehicle speed or driving conditions to increase or maximize efficiency.

Referring to FIGS. 1, 2, and 3, a hybrid vehicle includes a high temperature coolant loop 1 for cooling an internal combustion engine 5 and a low temperature coolant loop 2 for cooling electric/electronic components 6 and 7.

The high temperature coolant loop 1 may be configured to connect a water jacket of the internal combustion engine 5 and a high temperature radiator 3. The high temperature radiator 3 may cool a high temperature coolant (a relatively high temperature of about 110° C.)

The low temperature coolant loop 2 may be configured to connect coolant passages of the electric/electronic components 6 and 7 and a low temperature radiator 4. The low temperature radiator 4 may cool a low temperature coolant (a relatively low temperature of about 70° C.)

Referring to FIG. 2, in an HEV mode in which the vehicle is driven by only the operation of the internal combustion engine 5, the high temperature coolant circulates between the water jacket of the internal combustion engine 5 and the high temperature radiator 3 (see a solid line in FIG. 2). The high temperature coolant is supplied from the water jacket of the internal combustion engine 5 to the high temperature radiator 3, and is cooled by the high temperature radiator 3. In the HEV mode, since the electric/electronic components 6 and 7 do not operate, the low temperature coolant does not circulate between the electric/electronic components 6 and 7 and the low temperature radiator 4 (see a dotted line in FIG. 2).

Referring to FIG. 3, in an EV mode in which the vehicle is driven by only the operation of an electric motor 6, the low temperature coolant circulates the coolant passage of the electric motor 6, the coolant passage of the hybrid power control unit (HPCU) 7, an electric water pump (EWP) 8, an electric reservoir tank 9, and the low temperature radiator 4 (see a solid line in FIG. 3). The low temperature coolant (for example, 70° C.) is supplied from the coolant passages of the electric/electronic components 6 and 7 to the low temperature radiator 4, and is cooled by the low temperature radiator 4. In the EV mode, since the internal combustion engine 5 does not operate, the high temperature coolant does not circulate between the water jacket of the internal combustion engine 5 and the high temperature radiator 3 (see a dotted line in FIG. 3).

As described above, the high temperature radiator cools the high temperature coolant (for example, 110° C.), and the low temperature radiator cools the low temperature coolant (for example, 70° C.). That is, by taking the temperature of the coolant into consideration, heat dissipation performance of the high temperature radiator 3 is determined to be higher than heat dissipation performance of the low temperature radiator 4.

Meanwhile, the hybrid vehicle selectively drives in any one of the HEV mode in which only the internal combustion engine operates and the EV mode in which only the electric motor operates. Thus, the high temperature radiator and the low temperature radiator are not used at the same time. The heat dissipation performance of the high temperature radiator is determined based on the maximum heat transfer amount of the internal combustion engine, and the heat dissipation performance of the low temperature radiator is determined based on the maximum heat transfer amount of the electric/electronic components. For example, if the maximum heat transfer amount of the internal combustion engine is 10 KW, the heat dissipation performance of the high temperature radiator is approximately 10 KW, and if the maximum heat transfer amount of the electric/electronic components is 5 KW, the heat dissipation performance of the low temperature radiator is approximately 5 KW.

We have discovered that since the heat dissipation performance of the high temperature radiator is different from that of the low temperature radiator, the high temperature coolant loop is fluidly separated from the low temperature coolant loop, and thus it is practically impossible to apply an integrated structure in which the high temperature radiator is fluidly connected to the low temperature radiator. In addition, as the heat dissipation performance of the high temperature radiator and the heat dissipation performance of the low temperature radiator are different from each other, it is difficult to manage the cooling efficiency of the high temperature coolant loop and the cooling efficiency of the low temperature coolant loop as a whole.

The above information described in this background section is provided to assist in understanding the background of the inventive concept, and may include any technical concept which is not considered as the prior art that is already known to those skilled in the art.

SUMMARY

An aspect of the present disclosure provides a vehicle radiator assembly and a cooling system having the same capable of efficiently managing the cooling efficiency of a high temperature coolant loop and the cooling efficiency of a low temperature coolant loop.

According to an aspect of the present disclosure, a vehicle radiator assembly may include: a common inlet tank having a high temperature inlet chamber and a low temperature inlet chamber; a common outlet tank having a high temperature outlet chamber and a low temperature outlet chamber, and spaced apart from the common inlet tank; a high temperature radiator core including a plurality of high temperature tubes connecting the high temperature inlet chamber and the high temperature outlet chamber, and a plurality of high temperature cooling fins arranged with the plurality of high temperature tubes; a low temperature radiator core including a plurality of low temperature tubes connecting the low temperature inlet chamber and the low temperature outlet chamber, and a plurality of low temperature cooling fins arranged with the plurality of low temperature tubes; and a bimetal interposed between the high temperature radiator core and the low temperature radiator core. When a temperature of a high temperature coolant flowing into the high temperature radiator core is higher than or equal to a reference temperature, the bimetal may be bent so that the high temperature radiator core may be thermally connected to the low temperature radiator core.

The bimetal may include a first metal and a second metal joined to the first metal, and the first metal and the second metal may have different thermal expansion coefficients.

A longitudinal axis of each high temperature tube and a longitudinal axis of each low temperature tube may extend in a longitudinal direction of the vehicle radiator assembly, and the longitudinal axis of the high temperature tube may be parallel to the longitudinal axis of the low temperature tube. A width axis of the high temperature tube and a width axis of the low temperature tube may extend in a width direction of the vehicle radiator assembly, and the width axis of the high temperature tube may be parallel to the width axis of the low temperature tube. The high temperature tube may be spaced apart from the low temperature tube in the width direction of the vehicle radiator assembly, and the width axis of the high temperature tube may be located between the width axes of two adjacent low temperature tubes.

The bimetal may include a fixed end fixed to the high temperature tube and a free end opposing the fixed end.

The bimetal may be deformed according to the temperature of the high temperature coolant flowing into the high temperature tube. As the free end of the bimetal comes into contact with or is separated from the low temperature tube by the deformation of the bimetal, the high temperature tube may be thermally connected to or separated from the low temperature tube.

The bimetal may include an attachment portion connected to the fixed end, and the attachment portion may be attached to an edge of the high temperature tube.

The attachment portion may have a bonding surface which matches the edge of the high temperature tube, and the bonding surface may be bonded to the edge of the high temperature tube.

The bimetal may include a contact portion connected to the free end. As the bimetal is bent, the contact portion may come into contact with an edge of the low temperature tube.

The contact portion may have a contact surface which matches the edge of the low temperature tube.

According to another aspect of the present disclosure, a cooling system of a hybrid vehicle may include: a radiator assembly including a high temperature radiator core, a low temperature radiator core spaced apart from the high temperature radiator core, and a bimetal interposed between the high temperature radiator core and the low temperature radiator core; a high temperature coolant loop allowing a high temperature coolant to circulate, and connecting a water jacket of an internal combustion engine and the high temperature radiator core; and a low temperature coolant loop allowing a low temperature coolant to circulate, and connecting coolant passages of electric/electronic components, an electric water pump, a reservoir tank, and the low temperature radiator core. The low temperature radiator core, the reservoir tank, the electric water pump, and the electric/electronic components may be arranged along a flow direction of the low temperature coolant. When a temperature of the high temperature coolant flowing into the high temperature radiator core is higher than or equal to a reference temperature, the bimetal may be bent so that the high temperature radiator core may be thermally connected to the low temperature radiator core. The low temperature coolant loop may include a bypass flow path extending from a point between a downstream of the electric water pump and an upstream of the electric/electronic components to a downstream point of the electric/electronic components, and the bypass flow path may be connected to the low temperature coolant loop through a T-shaped connector and a three-way valve.

When the temperature of the high temperature coolant flowing into the high temperature radiator core is higher than or equal to the reference temperature, the low temperature coolant may circulate through the low temperature coolant loop and the low temperature coolant may be allowed to flow into the bypass flow path.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 15:
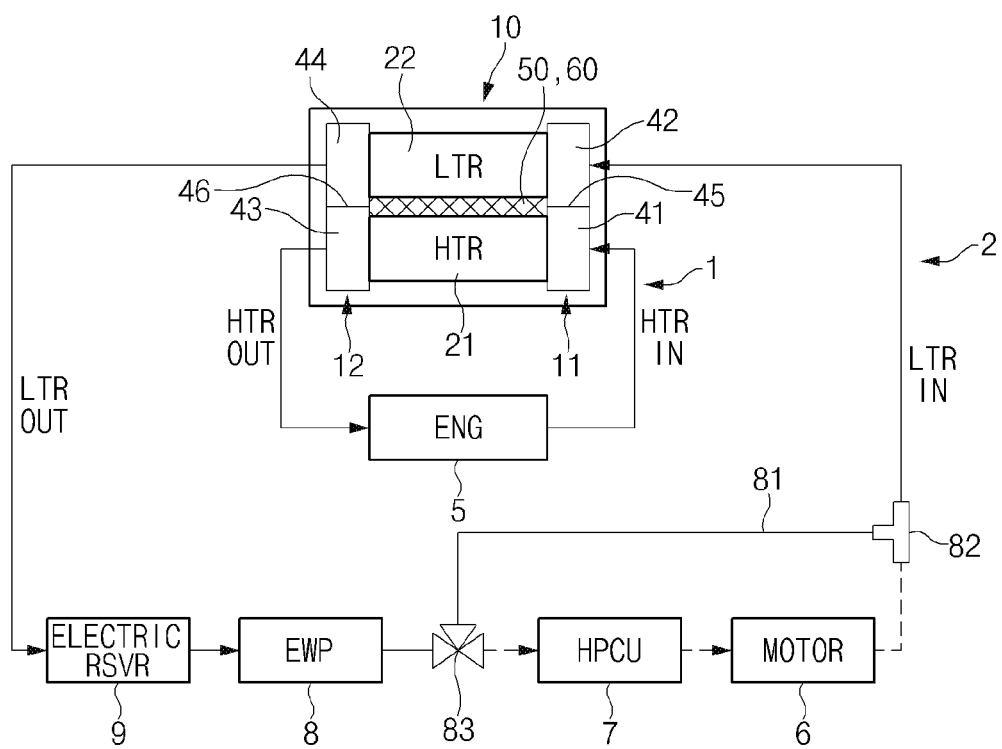
Figure 16:
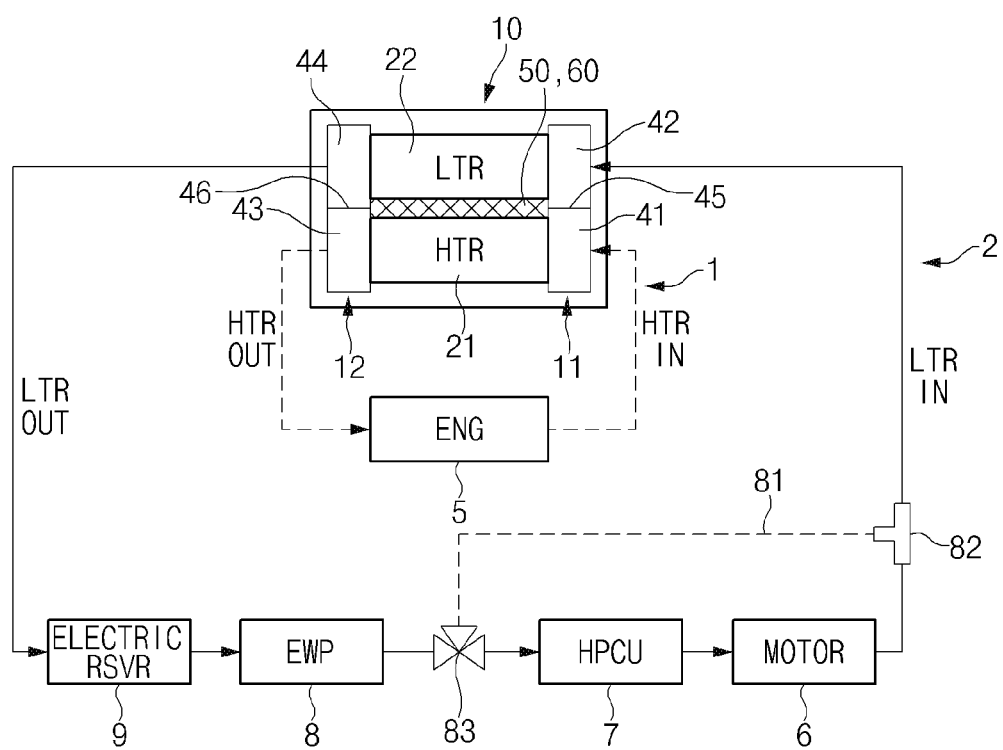

FIG. 15 illustrates a coolant flow in a cooling system of a hybrid vehicle according to an exemplary form of the present disclosure when a temperature of a coolant flowing into a high temperature radiator in an HEV mode is higher than or equal to a reference temperature; and FIG. 16 illustrates a coolant flow in an EV mode in a cooling system of a hybrid vehicle according to an exemplary foam of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These teams are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
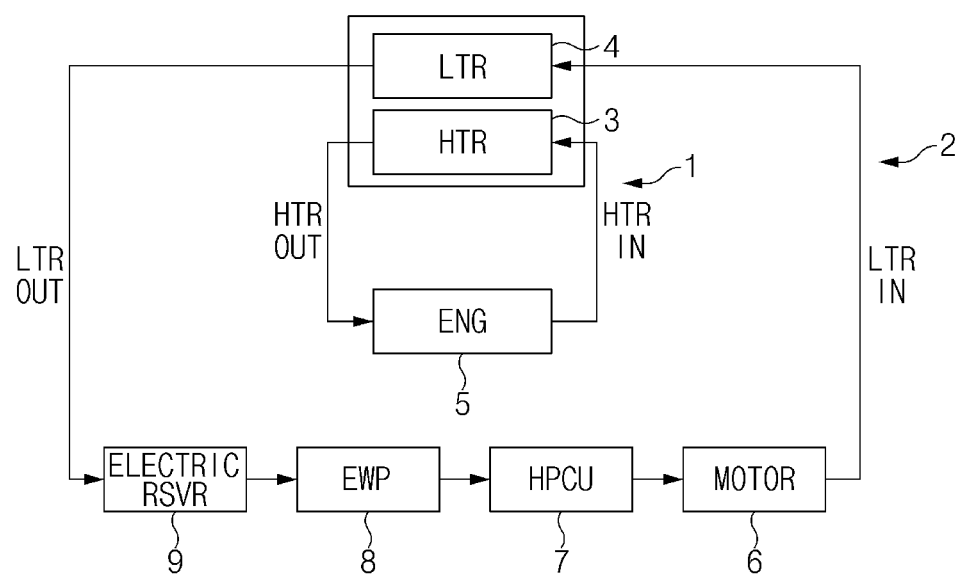
FIG. 1 illustrates a cooling system of a hybrid vehicle.
Figure 2:
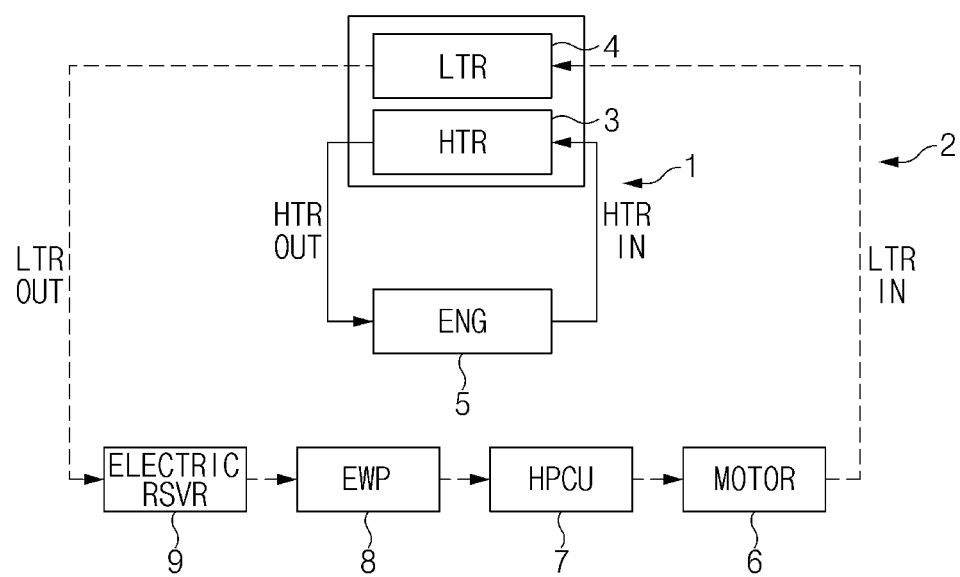
FIG. 2 illustrates an operating state of a high temperature coolant loop in a cooling system when a hybrid vehicle drives in an HEV mode.
Figure 3:
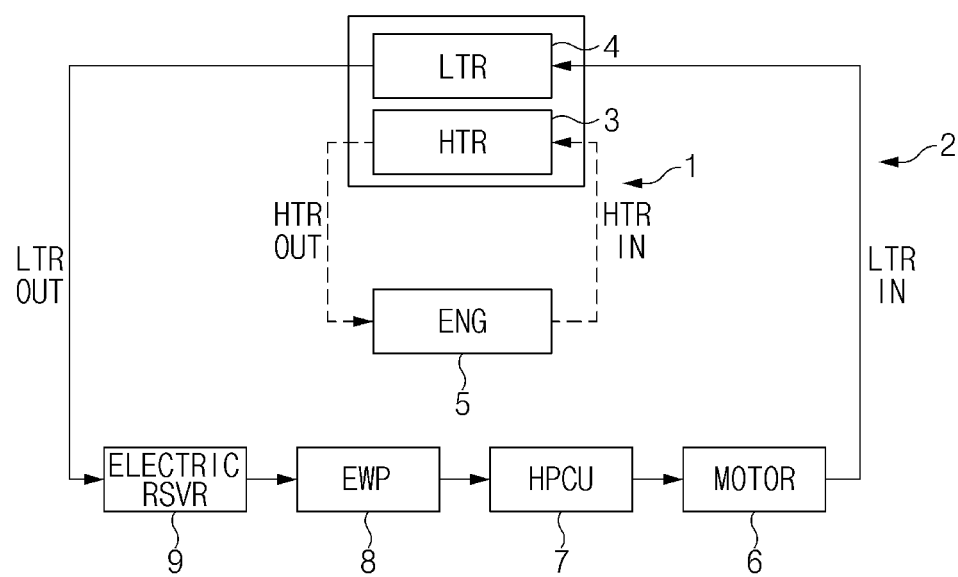
FIG. 3 illustrates an operating state of a low temperature coolant loop in a cooling system when a hybrid vehicle drives in an EV mode.
Figure 4:
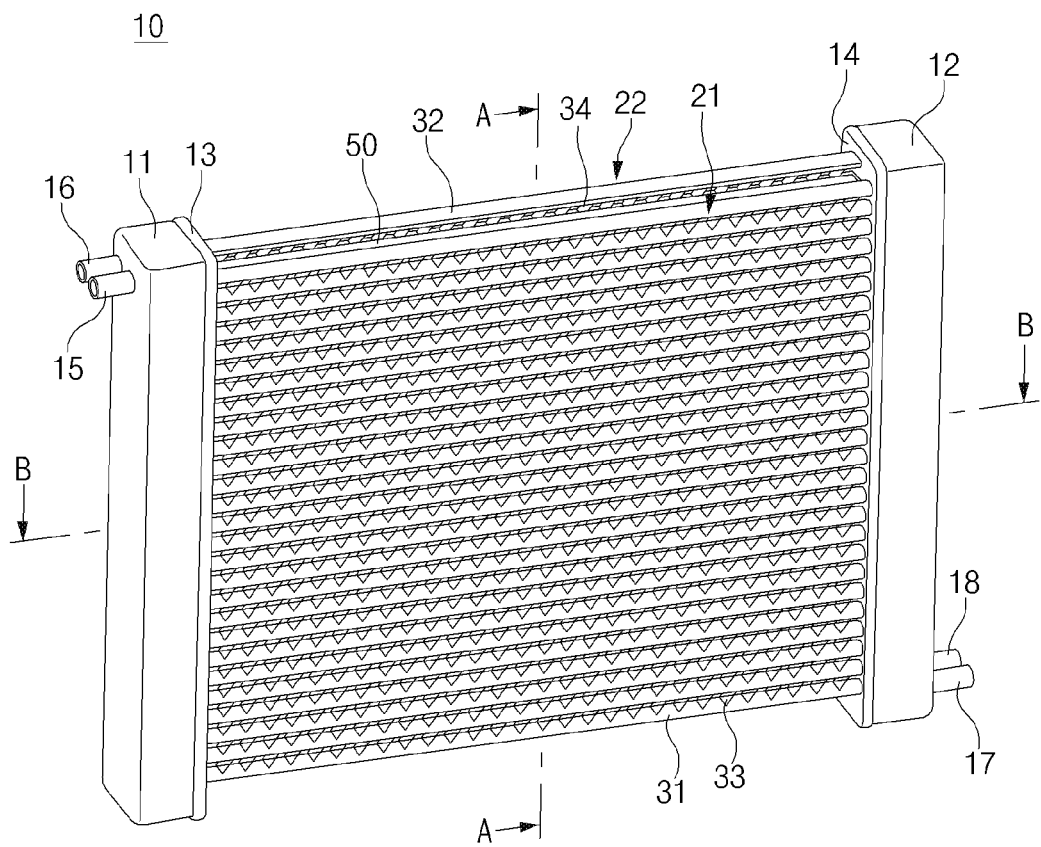
FIG. 4 illustrates a perspective view of a vehicle radiator assembly according to an exemplary form of the present disclosure.

Referring to FIG. 4, a vehicle radiator assembly 10 according to an exemplary form of the present disclosure may include: a common inlet tank 11, a common outlet tank 12 spaced apart from the common inlet tank 11, a high temperature radiator core 21, and a low temperature radiator core 22. The high temperature radiator core 21 and the low temperature radiator core 22 are disposed between the common inlet tank 11 and the common outlet tank 12 and arranged in parallel to each other.

Figure 6:
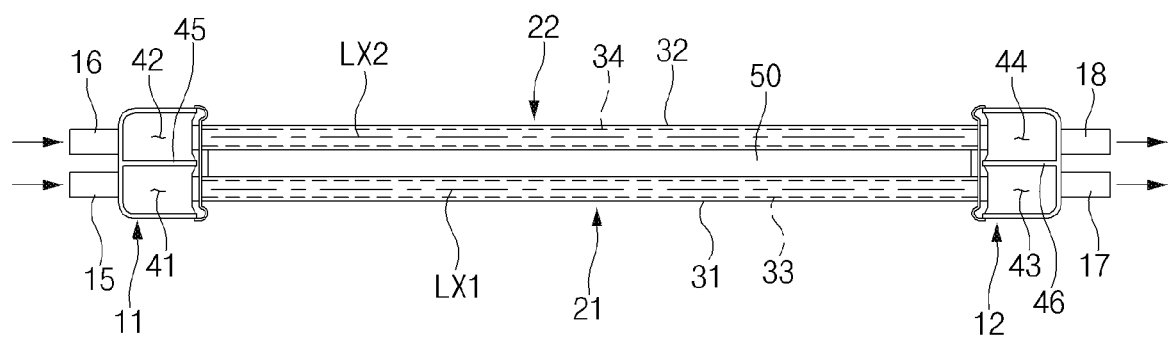
FIG. 6 illustrates a cross-sectional view taken along line B-B of FIG. 4.
Figure 14:
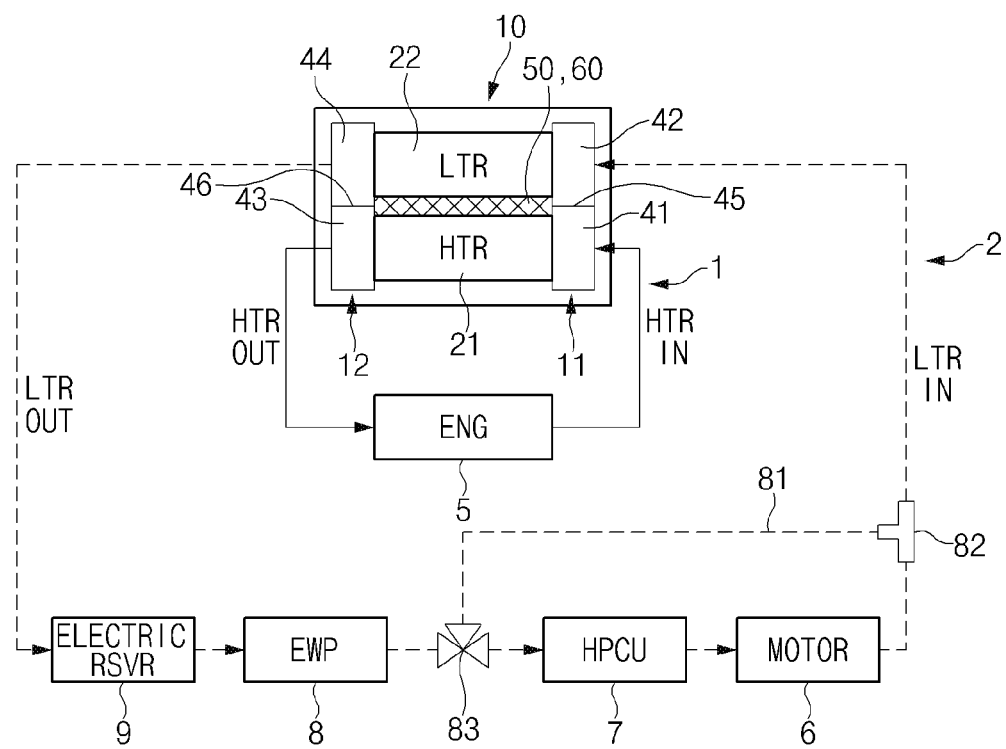
FIG. 14 illustrates a coolant flow in a cooling system of a hybrid vehicle according to an exemplary form of the present disclosure when a temperature of a coolant flowing into a high temperature radiator in an HEV mode is lower than a reference temperature.

Referring to FIGS. 6 and 14, the common inlet tank 11 may include a high temperature inlet chamber 41 receiving a high temperature coolant supplied from a water jacket of an internal combustion engine 5, and a low temperature inlet chamber 42 receiving a low temperature coolant supplied from electric/electronic components 6 and 7. The high temperature inlet chamber 41 and the low temperature inlet chamber 42 may be partitioned by a first partition so that the high temperature inlet chamber 41 and the low temperature inlet chamber 42 may be fluidly separated.

The common inlet tank 11 may include a high temperature inlet fitting 15 communicating with the high temperature inlet chamber 41, and a low temperature inlet fitting 16 communicating with the low temperature inlet chamber 42.

A high temperature inlet pipe extending from an outlet of the water jacket of the internal combustion engine 5 may be connected to the high temperature inlet fitting 15. Thus, the high temperature coolant may flow from the outlet of the water jacket of the internal combustion engine 5 to the high temperature inlet chamber 41 through the high temperature inlet fitting 15.

A low temperature inlet pipe extending from any one of the electric/electronic components 6 and 7 may be connected to the low temperature inlet fitting 16. For example, the low temperature inlet pipe extending from an outlet of a coolant passage of an electric motor 6 may be connected to the low temperature inlet fitting 16. Thus, the low temperature coolant may flow from the outlet of the coolant passage of the electric motor 6 to the low temperature inlet chamber 42 through the low temperature inlet fitting 16.

Referring to FIGS. 6 and 14, the common outlet tank 12 may include a high temperature outlet chamber 43 allowing the high temperature coolant to be discharged to the water jacket of the internal combustion engine 5, and a low temperature outlet chamber 44 allowing the low temperature coolant to be discharged to the electric/electronic components 6 and 7. The high temperature outlet chamber 43 and the low temperature outlet chamber 44 may be partitioned by a second partition 46 so that the high temperature outlet chamber 43 and the low temperature outlet chamber 44 may be fluidly separated.

The common outlet tank 12 may include a high temperature outlet fitting 17 communicating with the high temperature outlet chamber 43, and a low temperature outlet fitting 18 communicating with the low temperature outlet chamber 44.

A high temperature outlet pipe extending from an inlet of the water jacket of the internal combustion engine 5 may be connected to the high temperature outlet fitting 17. Thus, the high temperature coolant may flow from the high temperature outlet chamber 43 to the inlet of the water jacket of the internal combustion engine 5 through the high temperature outlet fitting 17.

A low temperature outlet pipe extending from any one of the electric/electronic components 6 and 7 may be connected to the low temperature outlet fitting 18. For example, the low temperature outlet pipe extending from an inlet of the electric reservoir tank 9 may be connected to the low temperature outlet fitting 18. Thus, the low temperature coolant may flow from the low temperature outlet chamber 44 to the inlet of the reservoir tank 9 through the low temperature outlet fitting 18.

The high temperature radiator core 21 may include a plurality of high temperature tubes 31 connecting the high temperature inlet chamber 41 and the high temperature outlet chamber 43. A plurality of high temperature cooling fins 33 may be interposed between two adjacent high temperature tubes 31, and thus the plurality of high temperature cooling fins 33 may be arranged to alternate with the plurality of high temperature tubes 31.

The low temperature radiator core 22 may include a plurality of low temperature tubes 32 connecting the low temperature inlet chamber 42 and the low temperature outlet chamber 44. A plurality of low temperature cooling fins 34 may be interposed between two adjacent low temperature tubes 32, and thus the plurality of low temperature cooling fins 34 may be arranged to alternate with the plurality of low temperature tubes 32.

The high temperature radiator core 21 may be spaced apart from the low temperature radiator core 22 in a width direction of the vehicle radiator assembly 10. That is, the high temperature tubes 31 may be spaced apart from the low temperature tubes 32 in the width direction of the vehicle radiator assembly 10, respectively, and the high temperature tubes 31 may be parallel to the low temperature tubes 32, respectively.

Figure 5:
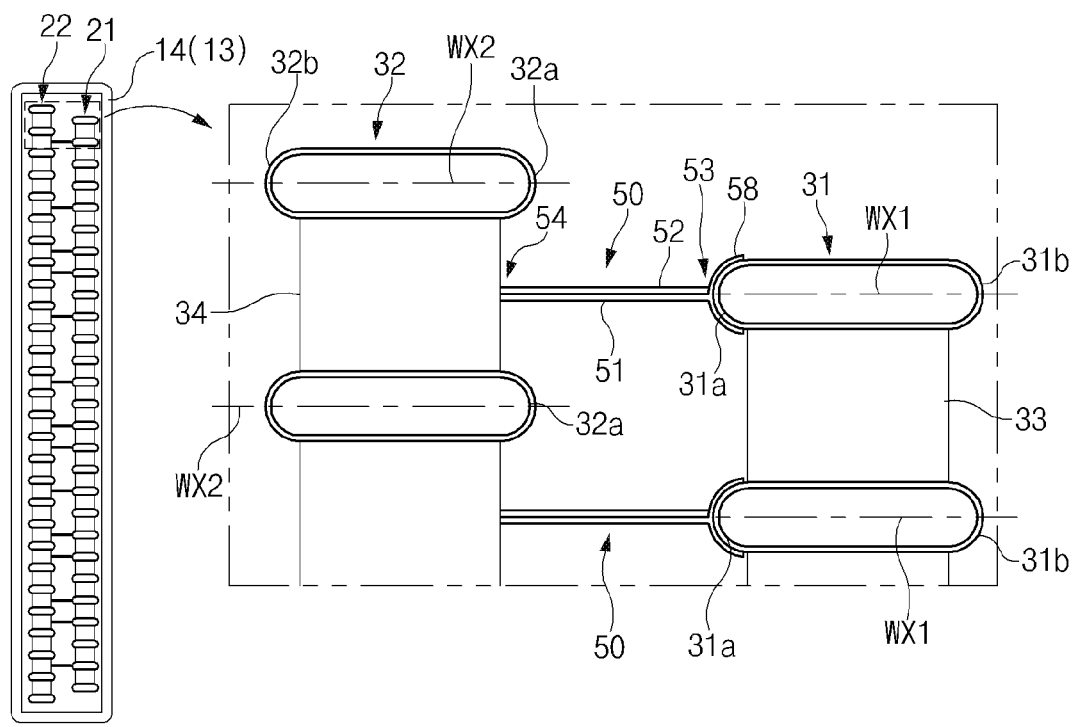
FIG. 5 illustrates a cross-sectional view taken along line A-A of FIG. 4.
Figure 7:
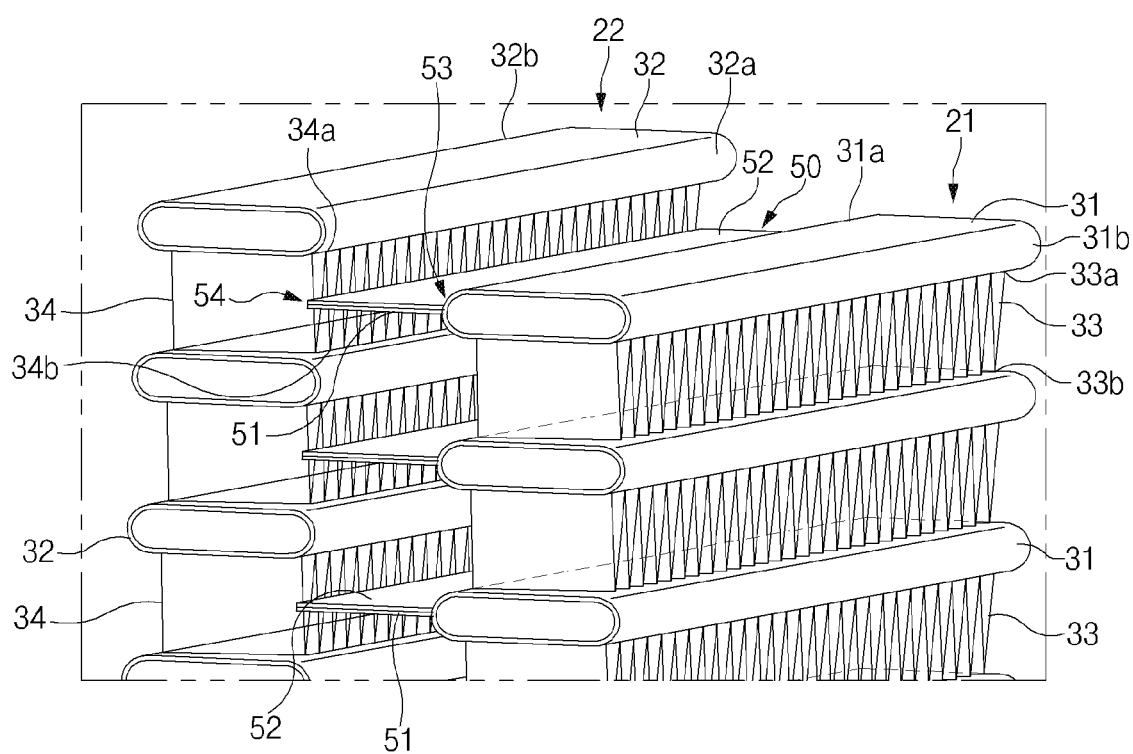
FIG. 7 illustrates a perspective view of a plurality of high temperature tubes, a plurality of high temperature cooling fins, a plurality of low temperature tubes, a plurality of low temperature cooling fins, and a plurality of bimetals in a vehicle radiator assembly according to an exemplary form of the present disclosure.

Referring to FIG. 5, a width axis WX1 of each high temperature tube 31 and a width axis WX2 of each low temperature tube 32 may extend in the width direction of the vehicle radiator assembly 10. The width axis WX1 of the high temperature tube 31 may be parallel to the width axis WX2 of the low temperature tube 32. The width axis WX1 of the high temperature tube 31 may be spaced apart from the width axis WX2 of the low temperature tube 32 in a height direction of the vehicle radiator assembly 10. Referring to FIGS. 5 and 7, the width axis WX1 of each high temperature tube 31 may be located between the width axes WX2 of two adjacent low temperature tubes 32. That is, the width axes WX1 of the high temperature tubes 31 may alternate with the width axes WX2 of the low temperature tubes 32 in the height direction of the vehicle radiator assembly 10. That is, the plurality of high temperature tubes 31 and the plurality of low temperature tubes 32 may be arranged in a staggered pattern. Thus, each high temperature tube 31 may be adjacent to the corresponding low temperature cooling fins 34 in a horizontal direction.

Referring to FIG. 6, a longitudinal axis LX1 of each high temperature tube 31 and a longitudinal axis LX2 of each low temperature tube 32 may extend in a longitudinal direction of the vehicle radiator assembly 10. The longitudinal axis LX1 of the high temperature tube 31 may be parallel to the longitudinal axis LX2 of the low temperature tube 32.

The common inlet tank 11 may include an inlet-side header plate 13 having a plurality of inlet-side slots, and an inlet end of each high temperature tube 31 and an inlet end of each low temperature tube 32 may be sealingly connected to the respective slots of the inlet-side header plate 13. The plurality of inlet-side slots may be arranged in a staggered pattern to correspond to the plurality of high temperature tubes 31 and the plurality of low temperature tubes 32.

The common outlet tank 12 may include an outlet-side header plate 14 having a plurality of outlet-side slots, and an outlet end of each high temperature tube 31 and an outlet end of each low temperature tube 32 may be sealingly connected to the respective slots of the outlet-side header plate 14. The plurality of outlet-side slots may be arranged in a staggered pattern to correspond to the plurality of high temperature tubes 31 and the plurality of low temperature tubes 32.

The vehicle radiator assembly 10 according to an exemplary form of the present disclosure may include a plurality of bimetals 50 interposed between the high temperature radiator core 21 and the low temperature radiator core 22.

Referring to FIGS. 5 and 7, each bimetal 50 may include: a first metal 51, and a second metal 52 joined to the first metal 51 by welding, using an adhesive, and/or the like, and the first metal 51 and the second metal 52 may have different thermal expansion coefficients. The first metal 51 may be joined under the second metal 52, and a thermal expansion coefficient of the first metal 51 may be higher than a thermal expansion coefficient of the second metal 52.

Each bimetal 50 may extend horizontally from the high temperature radiator core 21 toward the corresponding low temperature cooling fins 34. In particular, each bimetal 50 may have a fixed end 53 fixed to each high temperature tube 31 and a free end 54 opposing the fixed end 53.

The high temperature tube 31 may have a first edge 31a and a second edge 31b opposing each other. The first edge 31a may be adjacent to the low temperature tube 32, and the second edge 31b may be far away from the low temperature tube 32. The bimetal 50 may include an attachment portion 57 connected to the fixed end 53, and a shape of the attachment portion 57 may match that of the first edge 31a of the high temperature tube 31. The attachment portion 57 may be attached to the first edge 31a of the high temperature tube 31 by welding, using an adhesive, and/or the like. That is, the fixed end 53 of the bimetal 50 may be fixed to the high temperature tube 31 through the attachment portion 57.

Figure 10:
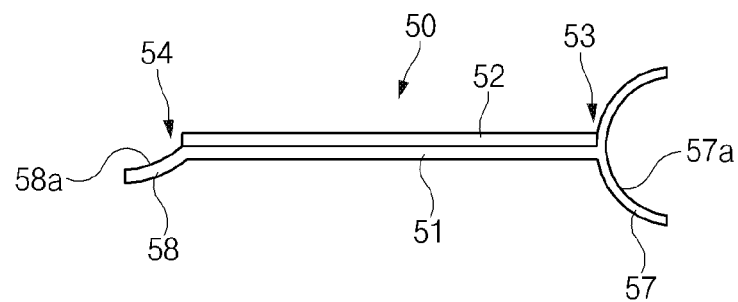
FIG. 10 illustrates an example of a bimetal used in a vehicle radiator assembly according to an exemplary form of the present disclosure.

Referring to FIG. 10, the first edge 31a and the second edge 31b may be rounded, and accordingly the high temperature tube 31 may be a welded tube having an oval cross-section, and the attachment portion 57 may have a curved shape to match the rounded first edge 31a of the high temperature tube 31. The attachment portion 57 may have a bonding surface 57a which matches the rounded first edge 31a of the high temperature tube 31, and the bonding surface 57a of the attachment portion 57 may be bonded to the first edge 31a of the high temperature tube 31 by welding, using an adhesive, and/or the like. In particular, the attachment portion 57 may be integrally connected to a first end (corresponding to the fixed end) of the first metal 51.

As the first metal 51 and the second metal 52 contract or expand according to the temperature of the high temperature coolant flowing into the high temperature tube 31 of the high temperature radiator core 21, the bimetal 50 may be flattened or deformed (bent), and the free end 54 of the bimetal 50 may be separated from the low temperature tube 32 or come into contact with the low temperature tube 32 by the deformation of the bimetal 50. For example, when the temperature of the high temperature coolant flowing into the high temperature tube 31 of the high temperature radiator core 21 (that is, the temperature of the high temperature coolant flowing into the high temperature inlet chamber 41 of the common inlet tank 11) is higher than or equal to a predetermined reference temperature (for example, 100° C.), the first metal 51 may expand more than the second metal 52. Thus, as illustrated in FIG. 9, the bimetal 50 may be bent and the free end 54 may come into contact with the low temperature tube 32. When the temperature of the high temperature coolant flowing into the high temperature tube 31 of the high temperature radiator core 21 is lower than a predetermined reference temperature (for example, 100° C.), the first metal 51 and the second metal 52 may contract. Thus, as illustrated in FIG. 8, the bimetal 50 may be flattened horizontally and the free end 54 may be separated from the low temperature tube 32.

Figure 8:
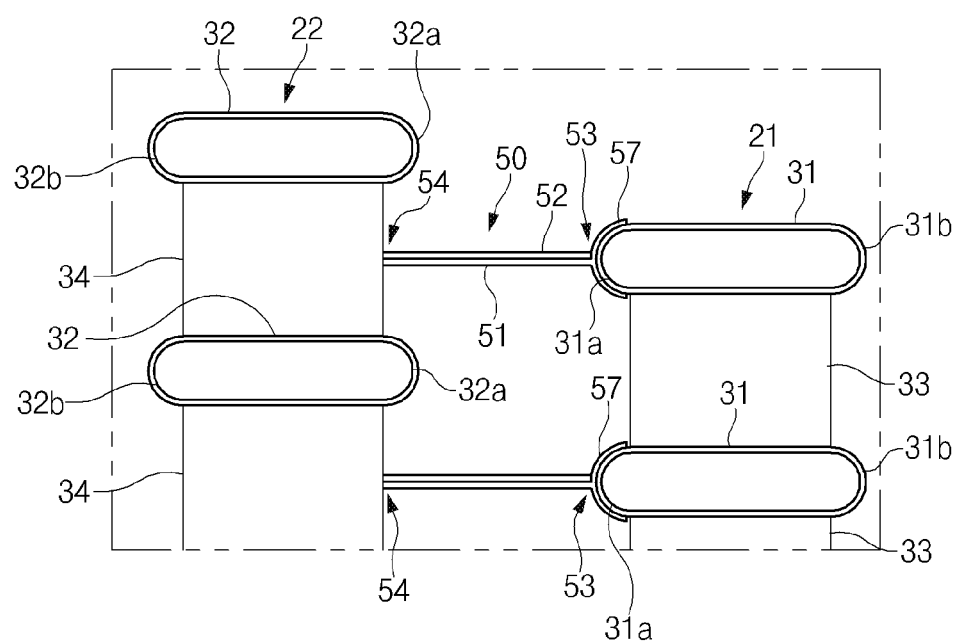
FIG. 8 illustrates a state in which bimetals are flattened in a vehicle radiator assembly according to an exemplary form of the present disclosure.
Figure 9:
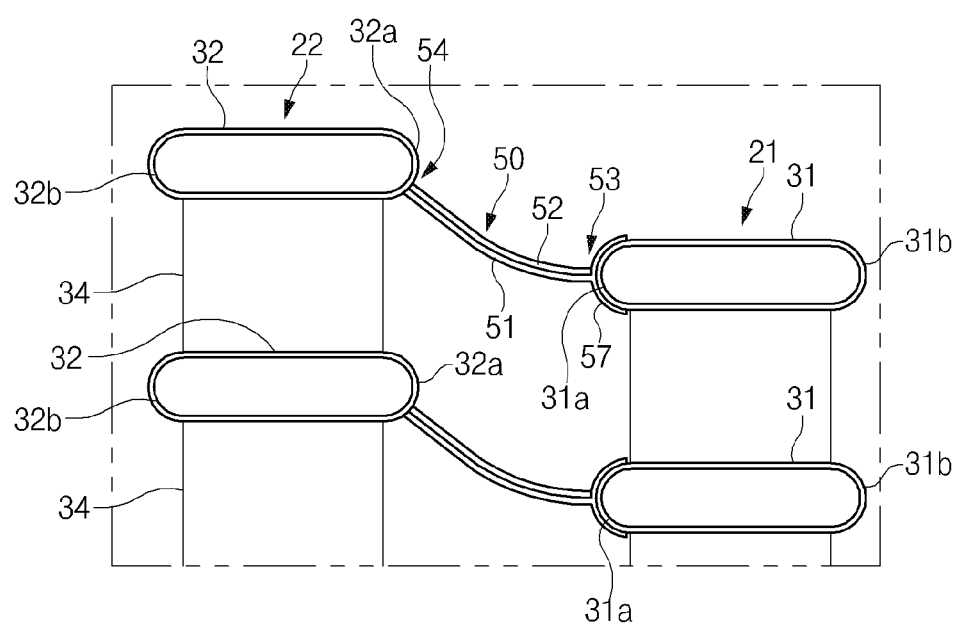
FIG. 9 illustrates a state in which bimetals are bent in a vehicle radiator assembly according to an exemplary form of the present disclosure.

Referring to FIG. 8, as the first metal 51 and the second metal 52 contract and the bimetal 50 is flattened horizontally, the free end 54 may be adjacent to or come into contact with the corresponding low temperature cooling fins 34 interposed between the two low temperature tubes 32 adjacent in a vertical direction.

Referring to FIG. 9, as the first metal 51 and the second metal 52 expand, the bimetal 50 may be bent toward the low temperature tube 32 located above the corresponding low temperature cooling fins 34, and thus the free end 54 may directly contact the low temperature tube 32.

The low temperature tube 32 may have a first edge 32a and a second edge 32b opposing each other. The first edge 32a may be adjacent to the high temperature tube 31, and the second edge 32b may be far away from the high temperature tube 31.

Figure 11:
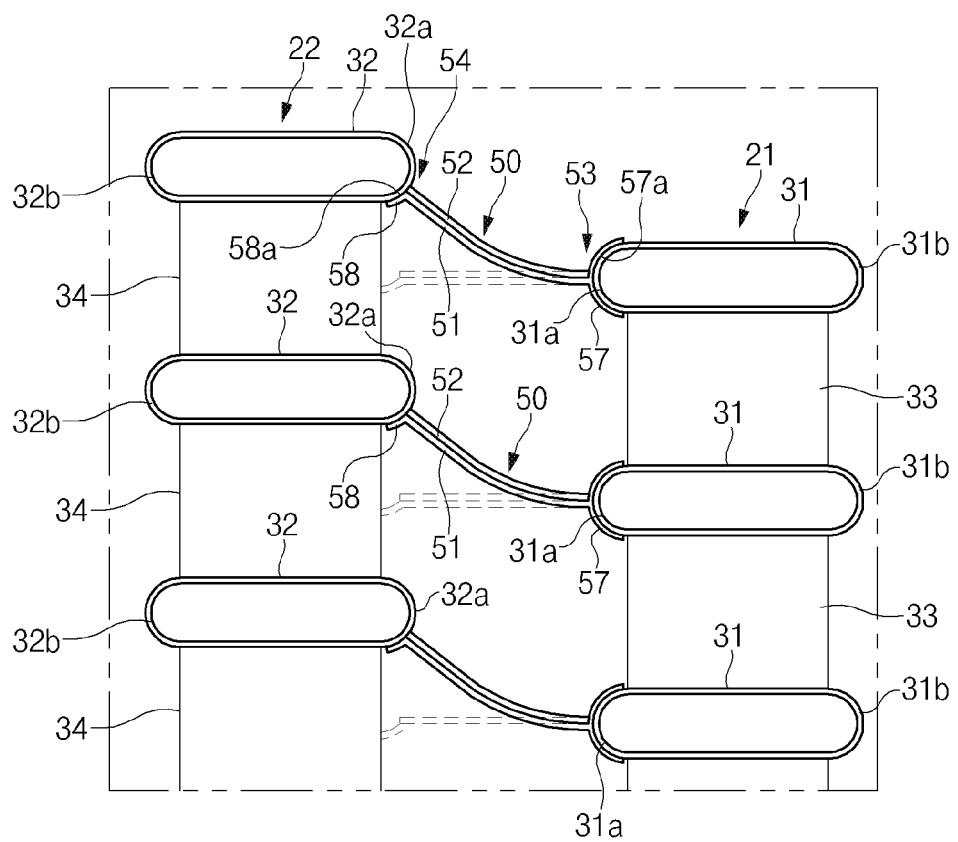
FIG. 11 illustrates an arrangement of the bimetals illustrated in FIG. 10 between a high temperature radiator and a low temperature radiator.

Referring to FIG. 10, the bimetal 50 may include a contact portion 58 connected to the free end 54. As the bimetal 50 is bent, the contact portion 58 may come into contact with the first edge 32a of the low temperature tube 32. The first edge 32a and the second edge 32b may be rounded, and accordingly the low temperature tube 32 may be a welded tube having an oval cross-section, and the contact portion 58 may have a curved shape to match the rounded first edge 32a of the low temperature tube 32. The contact portion 58 may have a contact surface 58a which matches the rounded first edge 32a of the low temperature tube 32, and thus the contact surface 58a of the contact portion 58 may be ensured to directly contact the first edge 32a of the low temperature tube 32. In particular, the contact portion 58 may be integrally connected to a second end (corresponding to the free end) of the first metal 51. As indicated by a solid line in FIG. 11, when the bimetal 50 is bent, the contact surface 58a of the contact portion 58 may directly contact the first edge 32a of the low temperature tube 32. As indicated by a dotted line in FIG. 11, when the bimetal 50 is flattened, the contact surface 58a of the contact portion 58 may be far away from the low temperature tube 32. That is, as the bimetal 50 is bent or flattened, the free end 54 may move between the low temperature cooling fins 34 and the low temperature tube 32.

When the temperature of the high temperature coolant flowing into the high temperature tube 31 of the high temperature radiator core 21 is lower than the reference temperature, the first and second metals 51 and 52 may contract and the bimetal 50 may be flattened. As illustrated in FIG. 8, the free end 54 of the bimetal 50 may be separated from the low temperature tube 32, and thus the high temperature tube 31 of the high temperature radiator core 21 may be thermally separated from the low temperature tube 32 of the low temperature radiator core 22. Thus, the high temperature coolant passing through the high temperature tube 31 may be cooled by only the heat dissipation performance (7 KW) of the high temperature radiator core 21.

When the temperature of the high temperature coolant flowing into the high temperature tube 31 of the high temperature radiator core 21 is higher than or equal to the predetermined reference temperature (for example, 100° C.), the first metal 51 may expand more than the second metal 52 and the bimetal 50 may be deformed (bent) toward the low temperature tube 32. As the bimetal 50 is bent from the low temperature cooling fins 34 toward the low temperature tube 32 as illustrated in FIG. 9, the free end 54 of the bimetal 50 may directly contact the low temperature tube 32, and thus the high temperature tube 31 of the high temperature radiator core 21 may be thermally connected to the low temperature tube 32 of the low temperature radiator core 22. As heat is transferred from the high temperature radiator core 21 to the low temperature radiator core 22, the high temperature coolant passing through an internal passage of the high temperature tube 31 may be cooled by the high temperature radiator core 21 and the low temperature radiator core 22. That is, when the temperature of the high temperature coolant flowing into the high temperature tube 31 is higher than or equal to the reference temperature, the low temperature radiator core 22 may assist in the cooling (heat dissipation) of the high temperature radiator core 21.

The reference temperature may be determined based on the maximum heat transfer amount of the internal combustion engine 5, and the high temperature radiator core 21 may have heat dissipation performance which is determined based on the reference temperature. For example, when the maximum heat transfer amount of the internal combustion engine 5 is 10 KW, the reference temperature may be determined as 100° C., and when the reference temperature is 100° C., the high temperature radiator core 21 may have the heat dissipation performance of 7 KW. Meanwhile, when the maximum heat transfer amount of the internal combustion engine 5 is 10 KW and the maximum heat transfer amount of the electric/electronic components 6 and 7 is 5 KW, a high temperature radiator according to the related art has the heat dissipation performance of 10 KW, and a low temperature radiator according to the related art has the heat dissipation performance of 5 KW. When the temperature of the high temperature coolant flowing into the high temperature radiator core 21 is lower than the reference temperature, the heat transfer amount (about 7 KW) of the internal combustion engine 5 is lower than the maximum heat transfer amount (about 10 KW) of the internal combustion engine 5. Accordingly, the heat dissipation performance of the high temperature radiator core 21 according to an exemplary form of the present disclosure may be 7 KW lower than the heat dissipation performance of the related art high temperature radiator, and the heat dissipation performance of the low temperature radiator core 22 according to an exemplary form of the present disclosure may be 5 KW equal to the heat dissipation performance of the related art low temperature radiator. That is, since the heat dissipation performance of the high temperature radiator core 21 is determined based on the reference temperature, it may be determined to be lower than the heat dissipation performance of the related art high temperature radiator. As the heat dissipation performance of the high temperature radiator core 21 is lowered, the manufacturing cost and weight of the high temperature radiator core 21 may be reduced. In particular, heat exchange efficiency in a cooling system of a hybrid vehicle may be improved significantly.

Figure 12:
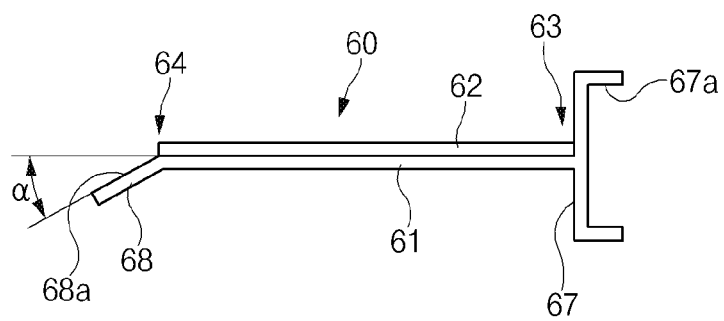
FIG. 12 illustrates another example of a bimetal used in a vehicle radiator assembly according to an exemplary form of the present disclosure.
Figure 13:
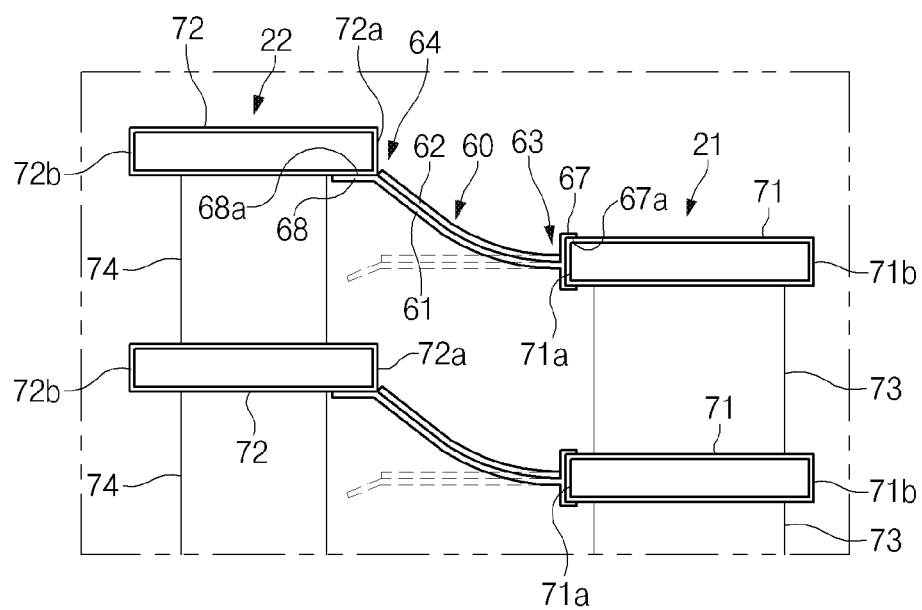
FIG. 13 illustrates an arrangement of the bimetals illustrated in FIG. 12 between a high temperature radiator and a low temperature radiator.

FIGS. 12 and 13 illustrate a vehicle radiator assembly according to another exemplary form of the present disclosure. Referring to FIG. 13, a high temperature tube 71 of the high temperature radiator core 21 may have a first edge 71a and a second edge 71b opposing each other. The first edge 71a may be adjacent to a low temperature tube 72, and the second edge 71b may be far away from the low temperature tube 72. A plurality of high temperature cooling fins 73 of the high temperature radiator core 21 may be interposed between two adjacent high temperature tubes 71, and thus the plurality of high temperature cooling fins 73 may be arranged to alternate with the plurality of high temperature tubes 71. The low temperature tube 72 of the low temperature radiator core 22 may have a first edge 72a and a second edge 72b opposing each other. The first edge 72a may be adjacent to the high temperature tube 71, and the second edge 72b may be far away from the high temperature tube 71. A plurality of low temperature cooling fins 74 of the low temperature radiator core 22 may be interposed between two adjacent low temperature tubes 72, and thus the plurality of low temperature cooling fins 74 may be arranged to alternate with the plurality of low temperature tubes 72.

A plurality of bimetals 60 may be interposed between the high temperature radiator core 21 and the low temperature radiator core 22. As illustrated in FIGS. 12 and 13, each bimetal 60 may include a first metal 61, and a second metal 62 joined to the first metal 61 by welding, using an adhesive, and/or the like. In one form, the first metal 61 and the second metal 62 may have different thermal expansion coefficients.

The first metal 61 may be joined under the second metal 62, and a thermal expansion coefficient of the first metal 61 may be higher than a thermal expansion coefficient of the second metal 62.

The bimetal 60 may extend from the high temperature tube 71 toward the corresponding low temperature cooling fins 74. In particular, the bimetal 60 may have a fixed end 63 fixed to the high temperature tube 71 and a free end 64 opposing the fixed end 63.

Referring to FIG. 12, the bimetal 60 may include an attachment portion 67 connected to the fixed end 63, and a shape of the attachment portion 67 may match that of the first edge 71*a* of the high temperature tube 71. The attachment portion 67 may be attached to the first edge 71*a* of the high temperature tube 71 by welding, using an adhesive, and/or the like. That is, the fixed end 63 of the bimetal 60 may be fixed to the high temperature tube 71 through the attachment portion 67.

Referring to FIG. 13, the first edge 71*a* and the second edge 71*b* may have a rectangular shape, and accordingly the high temperature tube 71 may be a folded tube having a rectangular cross-section. The attachment portion 67 may have a shape which matches that of the first edge 71*a* of the high temperature tube 71. The attachment portion 67 may have a bonding surface 67*a* which matches the first edge 71*a* of the high temperature tube 71, and the bonding surface 67*a* of the attachment portion 67 may be bonded to the first edge 71*a* of the high temperature tube 71 by welding, using an adhesive, and/or the like. In particular, the attachment portion 67 may be integrally connected to a first end (corresponding to the fixed end) of the first metal 61.

As the first metal 61 and the second metal 62 contract or expand according to the temperature of the high temperature coolant flowing into the high temperature tube 71 of the high temperature radiator core 21, the bimetal 60 may be flattened or deformed (bent), and the free end 64 of the bimetal 60 may be separated from the low temperature tube 72 or come into contact with the low temperature tube 72 by the deformation of the bimetal 60. For example, when the temperature of the high temperature radiator core 21 is higher than or equal to a predetermined reference temperature (for example, 100° C.), the first metal 61 may expand more than the second metal 62. Thus, the bimetal 60 may be bent as indicated by a solid line in FIG. 13 and the free end 64 may come into contact with the low temperature tube 72. When the temperature of the high temperature radiator core 21 is lower than a predetermined reference temperature (for example, 100° C.), the first metal 61 and the second metal 62 may contract. Thus, the bimetal 60 may be flattened horizontally as indicated by a dotted line in FIG. 13 and the free end 64 may be separated from the low temperature tube 72.

Referring to FIG. 12, the bimetal 60 may include a contact portion 68 connected to the free end 64. As the bimetal 60 is bent, the contact portion 68 may come into contact with the low temperature tube 72. The first edge 72*a* and the second edge 72*b* may have a rectangular shape, and accordingly the low temperature tube 72 may be a folded tube having a rectangular cross-section. The contact portion 68 may have a straight shape, which is inclined at a predetermined angle α, to match the first edge 72*a* of the low temperature tube 72. The contact portion 68 may have a contact surface 68*a* which matches the first edge 72*a* of the low temperature tube 72, and thus the contact surface 68*a* of the contact portion 68 may be ensured to directly contact the first edge 72*a* of the low temperature tube 72. In particular, the contact portion 68 may be integrally connected to a second end (corresponding to the free end) of the first metal 61. As indicated by the solid line in FIG. 13, when the bimetal 60 is bent, the contact surface 68*a* of the contact portion 68 may directly contact the first edge 72*a* of the low temperature tube 72. As indicated by the dotted line in FIG. 13, when the bimetal 60 is flattened, the contact surface 68*a* of the contact portion 68 may be far away from the low temperature tube 72. That is, as the bimetal 60 is bent or flattened, the free end 64 may move between the low temperature cooling fins 74 and the low temperature tube 72.

Referring to FIGS. 14 to 16, a cooling system of a hybrid vehicle according to an exemplary form of the present disclosure may include a high temperature coolant loop 1 for cooling the internal combustion engine 5 and a low temperature coolant loop 2 for cooling the electric/electronic components 6 and 7.

The high temperature coolant loop 1 may be configured to fluidly connect the water jacket of the internal combustion engine 5 and the high temperature radiator core 21. In an HEV mode, the high temperature coolant loop 1 may allow a high temperature coolant to circulate. The high temperature radiator core 21 may cool the high temperature coolant (about 110° C.)

The low temperature coolant loop 2 may be configured to fluidly connect the coolant passages of the electric/electronic components 6 and 7, an electric water pump (EWP) 8, the reservoir tank 9, and the low temperature radiator core 22. In an EV mode or when the temperature of the high temperature coolant flowing into the high temperature radiator core 21 is higher than or equal to the reference temperature, the low temperature coolant loop 2 may allow a low temperature coolant to circulate. The low temperature radiator core 22, the reservoir tank 9, the EWP 8, and the electric/electronic components 6 and 7 may be arranged along a flow direction of the low temperature coolant on the low temperature coolant loop 2. The low temperature radiator core 22 may cool the low temperature coolant (about 70° C.). For example, the electric/electronic components 6 and 7 may be an electric motor 6 and a hybrid power control unit (HPCU) 7, and the electric motor 6 may be located on the downstream side of the HPCU 7 in the flow direction of the low temperature coolant.

In addition, the low temperature coolant loop 2 may include a bypass flow path 81 extending from a point between the downstream of the EWP 8 and the upstream of the HPCU 7 to a downstream point of the electric motor 6. The bypass flow path 81 may be connected to the low temperature coolant loop 2 through a T-shaped connector 82 and a three-way valve 83.

The three-way valve 83 may connect the bypass flow path 81 to the point between the downstream of the EWP 8 and the upstream of the HPCU 7. Specifically, the three-way valve 83 may be located on the point between the downstream of the EWP 8 and the upstream of the HPCU 7, and an inlet of the bypass flow path 81 may be connected to the point between the downstream of the EWP 8 and the upstream of the HPCU 7 through the three-way valve 83. The three-way valve 83 may control the flow of the low temperature coolant in a manner that allows the low temperature coolant to selectively flow into the bypass flow path 81 and the electric/electronic components 6 and 7.

The T-shaped connector 82 may connect the bypass flow path 81 to the downstream point of the electric motor 6. Specifically, the T-shaped connector 82 may be located on the downstream point of the electric motor 6, and an outlet of the bypass flow path 81 may be connected to the downstream point of the electric motor 6 through the T-shaped connector 82.

Referring to FIGS. 14 and 15, in the HEV mode in which the hybrid vehicle is driven by only the operation of the internal combustion engine 5, the coolant may circulate between the water jacket of the internal combustion engine 5 and the high temperature radiator core 21.

Referring to FIG. 14, in the HEV mode, when the temperature of the high temperature coolant flowing into the high temperature radiator core 21 is lower than the reference temperature (for example, 100° C.), the bimetal 50 or 60 may be flattened and the free end 54 or 64 of the bimetal 50 or 60 may be separated from the low temperature tube 32 or 72 of the low temperature radiator core 22 (see FIG. 8, the dotted line in FIG. 11, and the dotted line in FIG. 13), and thus the high temperature tube 31 or 71 of the high temperature radiator core 21 may be thermally separated from the low temperature tube 32 or 72 of the low temperature radiator core 22. The high temperature coolant may circulate between the water jacket of the internal combustion engine 5 and the high temperature radiator core 21 on the high temperature coolant loop 1 (see a solid line in FIG. 14). The high temperature coolant may be sufficiently cooled by only the heat dissipation performance (for example, 7 KW) of the high temperature radiator core 21. Here, the low temperature coolant may not circulate on the low temperature coolant loop 2 (see a dotted line in FIG. 14).

Referring to FIG. 15, in the HEV mode, when the temperature of the high temperature coolant flowing into the high temperature tube 31 of the high temperature radiator core 21 is higher than or equal to the reference temperature (for example, 100° C.), the bimetal 50 or 60 may be bent and the free end 54 or 64 of the bimetal 50 or 60 may come into contact with the low temperature tube 32 or 72 of the low temperature radiator core 22 (see FIG. 9, the solid line in FIG. 11, and the solid line in FIG. 13), and thus the high temperature tube 31 or 71 of the high temperature radiator core 21 may be thermally connected to the low temperature tube 32 or 72 of the low temperature radiator core 22. The high temperature coolant may be cooled by the heat dissipation performance (for example, 7 KW) of the high temperature radiator core 21 and the heat dissipation performance (for example, 5 KW) of the low temperature radiator core 22. That is, the low temperature radiator core 22 may assist in the cooling (heat dissipation) of the high temperature radiator core 21. The high temperature coolant may circulate between the water jacket of the internal combustion engine 5 and the high temperature radiator core 21 on the high temperature coolant loop 1, and the low temperature coolant may circulate between the reservoir tank 9, the EWP 8, and the low temperature radiator core 22 on the low temperature coolant loop 2 (see a solid line in FIG. 15). Here, as the low temperature coolant passes through the bypass flow path 81 by the three-way valve 83, it may bypass the electric/electronic components such as the HPCU 7 and the electric motor 6 (see a dotted line in FIG. 15). That is, as the low temperature coolant circulates the reservoir tank 9, the EWP 8, and the low temperature radiator core 22, except for the electric/electronic components 6 and 7, on the low temperature coolant loop 2, the low temperature coolant loop 2 may effectively cool the heat transferred from the high temperature radiator core 21 to the low temperature radiator core 22.

Referring to FIG. 16, in the EV mode in which the hybrid vehicle is driven by only the operation of the electric motor 6, the low temperature coolant may flow along the electric motor 6, the low temperature radiator core 22, the reservoir tank 9, the EWP 8, and the HPCU 7 on the low temperature coolant loop 2 (see a solid line in FIG. 16). In the EV mode, since the internal combustion engine 5 does not operate, the high temperature coolant may not circulate between the water jacket of the internal combustion engine 5 and the high temperature radiator core 21 on the high temperature coolant loop 1 (see a dotted line in FIG. 16). In the EV mode, the low temperature coolant may be cooled by only the heat dissipation performance (for example, 5 KW) of the low temperature radiator core 22.

According to an exemplary form of the present disclosure, the high temperature radiator core 21 and the low temperature radiator core 22 may be manufactured by brazing welding. Specifically, the plurality of high temperature cooling fins 33 may be joined to the plurality of high temperature tubes 31 by brazing welding, and the plurality of low temperature cooling fins 34 may be joined to the plurality of low temperature tubes 32 by brazing welding. For example, while the tubes and the cooling fins are moving horizontally through a conveyor belt in a state in which the plurality of high temperature tubes 31 and the plurality of high temperature cooling fins 33 are laid horizontally on a jig to be parallel to the plurality of low temperature tubes 32 and the plurality of low temperature cooling fins 34, the plurality of high temperature cooling fins 33 and the plurality of high temperature tubes 31 may be joined by brazing welding, and the plurality of low temperature cooling fins 34 and the plurality of low temperature tubes 32 may be joined by brazing welding. The plurality of low temperature tubes 32 and the plurality of low temperature cooling fins 34 may be located above the plurality of high temperature tubes 31 and the plurality of high temperature cooling fins 33, and thus there is a possibility that the low temperature cooling fins 34 may fall down or come off during the brazing welding. By interposing the plurality of bimetals 50 between the low temperature cooling fins 34 and the high temperature tubes 31, the low temperature cooling fins 34 may be prevented from falling down or coming off during the brazing welding. That is, the production quality of the high temperature radiator core 21 and the low temperature radiator core 22 may be improved by the bimetals 50 or 60.

As set forth above, according to exemplary forms of the present disclosure, the high temperature radiator core and the low temperature radiator core may be arranged in parallel between the common inlet tank and the common outlet tank, and the bimetals may be interposed between the high temperature radiator core and the low temperature radiator core. The high temperature radiator core may be thermally connected to the low temperature radiator core by the bimetals during the operation of the internal combustion engine so that the low temperature radiator core may assist in the cooling (heat dissipation) of the high temperature radiator core. Thus, the cooling performance of the high temperature coolant loop fluidly connected to the high temperature radiator core and the cooling performance of the low temperature coolant loop fluidly connected to the low temperature radiator core may be efficiently managed.

In addition, by allowing the heat dissipation performance of the high temperature radiator core to be lower than that of the related art high temperature radiator, the manufacturing cost and weight of the high temperature radiator core may be reduced, and the efficient cooling system may be provided.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A vehicle radiator assembly, comprising:
a common inlet tank including: a high temperature inlet chamber and a low temperature inlet chamber;
a common outlet tank including: a high temperature outlet chamber and a low temperature outlet chamber, the common outlet tank configured to be spaced apart from the common inlet tank;
a high temperature radiator core including: a plurality of high temperature tubes connecting the high temperature inlet chamber and the high temperature outlet chamber, and a plurality of high temperature cooling fins arranged with the plurality of high temperature tubes;
a low temperature radiator core including: a plurality of low temperature tubes connecting the low temperature inlet chamber and the low temperature outlet chamber, and a plurality of low temperature cooling fins arranged with the plurality of low temperature tubes; and
a bimetal interposed between the high temperature radiator core and the low temperature radiator core,
wherein when a temperature of a high temperature coolant flowing into the high temperature radiator core is equal to or higher than a reference temperature, the bimetal is deformed and configured to thermally connect the high temperature radiator core to the low temperature radiator core.

2. The vehicle radiator assembly according to claim 1, wherein the bimetal includes: a first metal, and a second metal joined to the first metal, and
the first metal and the second metal have different thermal expansion coefficients.

3. The vehicle radiator assembly according to claim 2, wherein a longitudinal axis of high temperature tubes of the plurality of high temperature tubes and a longitudinal axis of low temperature tubes of the plurality of low temperature tubes are parallel to each other and extend in a longitudinal direction of the vehicle radiator assembly,
a width axis of the high temperature tubes and a width axis of the low temperature tubes are parallel to each other and extend in a width direction of the vehicle radiator assembly,
the high temperature tubes are spaced apart from the low temperature tubes in the width direction of the vehicle radiator assembly, and
the width axis of the respective high temperature tubes of the plurality of high temperature tubes is located between the width axes of two adjacent low temperature tubes among the plurality of low temperature tubes.

4. The vehicle radiator assembly according to claim 3, wherein the bimetal includes: a fixed end fixed to a corresponding high temperature tube among the plurality of high temperature tubes, and a free end opposing to the fixed end.

5. The vehicle radiator assembly according to claim 4, wherein:
the bimetal is deformed when the temperature of the high temperature coolant flowing into the corresponding high temperature tube is equal to or higher than the reference temperature, and
when the bimetal is deformed, the free end of the bimetal is configured to come into contact with a corresponding low temperature tube among the plurality of low temperature tubes such that the corresponding high temperature tube is thermally connected to the corresponding low temperature tube.

6. The vehicle radiator assembly according to claim 4, wherein when the temperature of the high temperature coolant flowing into the corresponding high temperature tube is lower than the reference temperature, the free end of the bimetal is separated from a corresponding low temperature tube among the plurality of low temperature tubes such that the corresponding high temperature tube is thermally separated from the corresponding low temperature tube.

7. The vehicle radiator assembly according to claim 4, wherein:
the bimetal includes an attachment portion connected to the fixed end, and
the attachment portion is attached to an edge of the corresponding high temperature tube.

8. The vehicle radiator assembly according to claim 7, wherein:
the attachment portion has a bonding surface which matches the edge of the corresponding high temperature tube, and
the bonding surface is bonded to the edge of the corresponding high temperature tube.

9. The vehicle radiator assembly according to claim 4, wherein:
the bimetal includes a contact portion connected to the free end,
as the bimetal is deformed, the contact portion is configured to come into contact with an edge of a corresponding low temperature tube among the plurality of low temperature tubes.

10. The vehicle radiator assembly according to claim 9, wherein the contact portion has a contact surface which matches the edge of the corresponding low temperature tube.

* * * * *